United States Patent Office 3,429,679
Patented Feb. 25, 1969

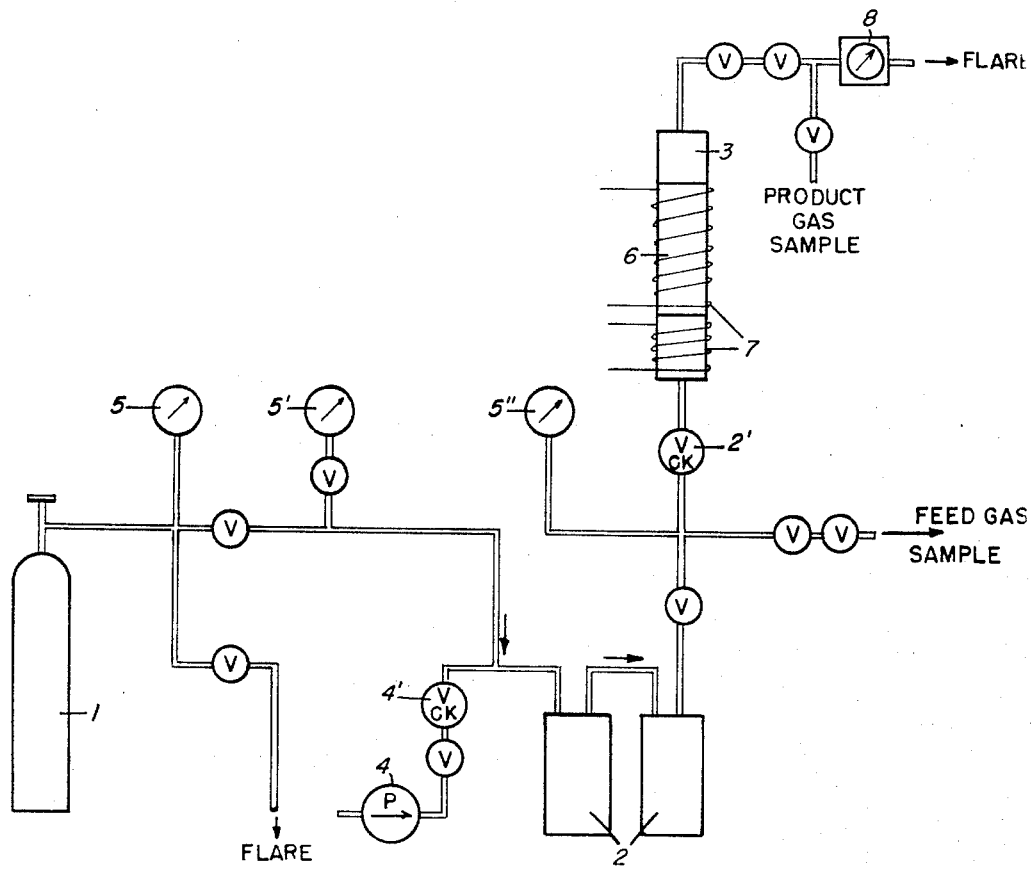

3,429,679
PROCESS FOR IMPROVING THE HEATING
VALUES OF FUEL GASES
Sam Friedman and Raymond W. Hiteshue, Pittsburgh,
Pa., assignors to the United States of America as represented by the Secretary of the Interior
Filed June 7, 1965, Ser. No. 462,150
U.S. Cl. 48—197   7 Claims
Int. Cl. C07c 1/04, 1/12

ABSTRACT OF THE DISCLOSURE

CO and/or $CO_2$ are reacted with $H_2$ in the presence of $WS_2$ to form $CH_4$.

---

The invention herein described and claimed may be manufactured and used by or for the Government of the United States of America for governmental purposes without the payment of royalties thereon or therefor.

The figure is a schematic flow diagram of the apparatus employed in the examples.

This invention relates to conversion of mixtures of hydrogen and oxides of carbon to gasous paraffinic hydrocarbons of high heating value.

Natural gas, the principal fuel gas used in the United States consists essentially of methane and has a gross heating value of 1,000 B.t.u. per cu. ft. Over the past few years considerable research work has been conducted to develop processes which would produce a fuel gas from coal with a high heating value so as to supplement the available reserves of natural gas.

Coal may be gasified by reaction with steam at about 1000–6000 p.s.i.g. and at elevated temperature of about 800° C. The product of such a reaction typically contains about 49% $H_2$, 26% $CH_4$, 1% $C_2H_6$, 11% CO and 13% $CO_2$ and has a gross heating value of about 480 B.t.u./s.c.f. Since the heats of combustion of gaseous paraffinic hydrocarbons are high, that of carbon monoxide and hydrogen low, and of carbon dioxide nil, a considerable increase in the heating value of the product gas would occur if the carbon oxides were reacted with the hydrogen in the gas to produce paraffinic hydrocarbons.

It has now been found that such a reaction may be advantageously achieved by the use of tungsten sulfide ($WS_2$) as a catalyst. The reactions that occur are essentially as follows:

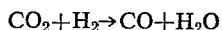
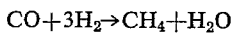

It has also been found that the use of $WS_2$ as catalyst is particularly effective in methanation (synthesis of gaseous paraffinic hydrocarbons from mixtures of hydrogen and carbon monoxide) in the presence of sulfur compounds, such as hydrogen sulfide, since the $WS_2$ catalyst is not poisoned by the sulfur compound. By contrast, conventional iron and nickel catalysts are rapidly poisoned by the presence of sulfur compounds. This necessitates extensive gas purification facilities to maintain catalyst activity; these facilities are not required when $WS_2$ is employed as catalyst and the cost of the fuel gas product is, accordingly, substantially lower.

The feed gas containing a mixture of hydrogen, CO and $CO_2$ is advantageously obtained by gasification of coal with steam as described above. However, the invention is not limited to this source of the feed gas but is applicable to mixtures of hydrogen, CO and $CO_2$, with or without other gaseous ingredients, from any source. For methanation, the feed gas (synthesis gas) should contain hydrogen and CO in a volume ratio of about 3 to 1 since the primary reaction is

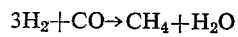

Furthermore, when the hydrogen; carbon monoxide ratios are reduced much below 3 the secondary water-gas shift becomes prominent:

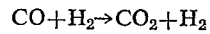

The conversion reactions of the invention are carried out at elevated temperature and pressure. Optimum values of temperature and pressure may, however, vary considerably according to the composition of the feed gas, type and amount of catalyst, throughput speed, etc., and are best determined experimentally. For increasing the heating value of a fuel gas containing substantial amounts of $CO_2$ as well as CO, temperatures of from about 475° C. to 600° C. and pressures of from about 50 p.s.i. to 6000 p.s.i. are generally satisfactory. For methanation, suitable temperatures will range from about 475° C. to 600° C. with pressures being from about 500 p.s.i.g. to 4000 p.s.i.g. Preferred conditions for methanation are, however, pressures in excess of 1000 p.s.i.g. and a temperature of about 475° C.

The catalyst may consist of $WS_2$, finely divided or in other suitable form such as pellets, etc., or of $WS_2$ on a suitable carrier such as alumina. Such catalysts are conventional for other reactions and their preparation will be obvious to one of ordinary skill in the art.

The invention will be more specifically illustrated by the following examples.

Example 1

The apparatus employed is shown schematically in the figure. The feed gas was blended in cylinder 1 and charged to gas reservoir 2 with check valve 2'. The gas was compressed to operating pressure and displaced into reactor 3 by constant rate water pump 4 with check valve 4'. A flare was provided for purging or depressuring when desired. Pressures were measured by meters 5, 5' and 5". Tempertures of the gas reservoir was maintained at 100° C. to prevent adsorption of $CO_2$ by the water. The reactor, containing catalyst bed 6, was maintained at 475° C. by means of heaters 7. Gas flow rate was measured by gas meter 8. Pressures were varied from 50 to 6000 p.s.i.g. and product gas was sampled every 15 minutes. Steady state conditions were indicated by uniform composition of successive gas samples. Experimental conditions and results are given in Table 1.

The catalyst, prepared from 10 x 10 mm. cylindrical pellets of $WS_2$, was crushed to 30 x 50 mesh U.S. sieve mesh size and 65 grams was charged to the ⅝ inch O.d. x 5/16 inch i.d. stainless steel reactor. The catalyst occupied 33 cc. of reaction space.

was maintained at 100° C. to prevent absorption of the $CO_2$ by the water. At 4,000 p.s.i.g. the gas flow rate was

TABLE 1.—UPGRADING SIMULATED PRODUCT GAS OF STEAM-COAL REACTION

| Experiment No.: | Pressure, p.s.i.g. | Space velocity, Vol./vol./hr. | Feed gas | | | | | Product gas | | | | | | | Increase in heating value, pct.[3] |
|---|---|---|---|---|---|---|---|---|---|---|---|---|---|---|---|
| | | | Composition, vol. pct.[1] | | | | Gross heating value, B.t.u./ std. cu. ft. | Composition, vol. pct.[2] | | | | | Gross heating value, B.t.u./s.c.f. | | |
| | | | $H_2$ | $CH_4$ | $CO_2$ | CO | | $H_2$ | $CH_4$ | $C_2H_6$ | $CO_2$ | CO | Total gas | $CO_2$-free | |
| 1 | 50 | 10 | 45.1 | 34.2 | 16.6 | 4.1 | 505 | 25.3 | 55.2 | | 15.6 | 3.9 | 655 | 775 | 30 |
| 2 | 500 | 100 | 48.0 | 31.9 | 15.8 | 4.3 | 495 | 20.2 | 63.6 | 0.2 | 15.2 | 0.2 | 710 | 850 | 43 |
| 3 | 1,000 | 200 | 44.8 | 30.7 | 21.4 | 3.1 | 465 | 13.4 | 65.6 | .2 | 20.8 | | 715 | 905 | 54 |
| 4 | 1,000 | 1,200 | 48.4 | 30.9 | 17.2 | 3.5 | 480 | 39.0 | 43.7 | .2 | 12.4 | 4.7 | 590 | 610 | 23 |
| 5 | 2,000 | 400 | 44.5 | 32.0 | 20.5 | 3.0 | 480 | 10.8 | 69.3 | .4 | 19.5 | | 745 | 925 | 55 |
| 6 | 2,000 | 1,200 | 46.8 | 32.8 | 18.0 | 2.4 | 490 | 22.5 | 63.4 | .6 | 13.3 | 0.2 | 725 | 840 | 48 |
| 7 | 4,000 | 800 | 45.0 | 34.0 | 17.5 | 2.9 | 495 | 10.7 | 71.8 | .3 | 17.2 | | 770 | 935 | 56 |
| 8 | 4,000 | 1,200 | 46.2 | 33.9 | 17.4 | 2.5 | 500 | 15.2 | 71.1 | .8 | 12.9 | | 785 | 900 | 57 |
| 9 | 6,000 | 1,200 | 46.1 | 32.2 | 18.7 | 3.0 | 485 | 4.6 | 73.8 | .6 | 21.0 | | 775 | 980 | 60 |

[1] Average of three analyses. [2] Average of final three analyses at steady state conditions. [3] $\frac{\text{Heating value of total product gas}}{\text{Heating value of feed gas}} - 1 \times 100$.

Example 2

This example shows the effectiveness of $WS_2$ for methanation in the presence of hydrogen sulfide. Catalyst and apparatus were the same as in Example 1. The feed gas consisted essentially of hydrogen and CO in a 3:1 ratio, with minor amounts of other gases, including various concentrations of $H_2S$. Typical analysis of the gas by chromatography was

| | |
|---|---|
| $H_2$ | percent 73.5 |
| $O_2$ | do 0.1 |
| $N_2$ | do 0.5 |
| CO | 25.3 |
| $CH_4$ | 0.2 |
| $CO_2$ | 0.2 |
| $H_2S$ | 0.2 |

The reaction system was first purged with nitrogen gas followed by a purge with hydrogen. The hydrogen purge was continued for 2 hours at a gas rate of 1.5 cu. ft./hr. The reactor system was then pressurized to 2,000 p.s.i.g. hydrogen and purged with feed gas from the reservoirs. The gas in the reservoirs was compressed to pressures >2,000 p.s.i.g., and fed into the reactor by the constant rate water pump. The temperature of the gas reservoirs established by water displacement at 100 ml./hr., equivalent to 800 vol. gas/vol. catalyst/hr. Heat was then applied to the reactor and the temperature of the catalyst was increased to 475° C. in about 30 minutes. The flow of gas was continued for the duration of the experiment and product gas samples were taken hourly. Experimental conditions and results are shown in Table 2.

Experiments 1 and 2 were 7 hours duration with experiment 3 being 26 hours duration; product gas samples were taken in experiment 3 after 5, 12, 20 and 26 hours. Conversion of $H_2$ and CO to hydrocarbon gas was in excess of 85% in all experiments. In addition, gross heating values of all product gases were essentially equal, indicating that the activity of the catalyst was not affected by the presence of the sulfur compound.

TABLE 2.—CONVERSION OF SYNTHESIS GAS TO METHANE IN PRESENCE OF TUNGSTEN SULFIDE CATALYST AT 475° C. AND 4,000 P.S.I.G. AND 70 VOL./VOL./HR.

| Exp. No. | Feed gas | | Product gas | | | | | | |
|---|---|---|---|---|---|---|---|---|---|
| | Space velocity, Vol./vol./hr. | Sulfur grains per 100 s.c.f. | Composition, volume-percent | | | | | Gross heating value, B.t.u./s.c.f. | |
| | | | $H_2$ | CO | $CH_4$ | $CO_2$ | $C_2H_6$ | Total gas | $CO_2$-free |
| 1 | 820 | 5 | 29.5 | 0.0 | 59.0 | 7.3 | 4.2 | 770 | 830 |
| 2 | 700 | 88 | 20.2 | .0 | 69.8 | 6.8 | 3.1 | 830 | 890 |
| 3a | 820 | 75 | 19.7 | .0 | 70.0 | 7.7 | 2.6 | 820 | 890 |
| 3b | 820 | 73 | 23.8 | .4 | 64.4 | 8.6 | 2.8 | 780 | 855 |
| 3c | 820 | 49 | 24.7 | .5 | 61.9 | 9.8 | 2.9 | 760 | 845 |
| 3d | 820 | 79 | 24.4 | .0 | 62.9 | 9.4 | 3.2 | 775 | 855 |

3a After 5 hours.
3b After 12 hours.
3c After 20 hours.
3d After 26 hours.

Example 3

Reaction conditions and apparatus were the same as those of Example 2 except that varying temperatures were employed. Experimental conditions and results are given in Table 3. As seen from the table, preferred reaction conditions are 4000 p.s.i. at 475° C. and 1000 p.s.i. at 550° C.

TABLE 3.—DATA SHOWING THE EFFECT OF LOWER PRESSURES AND HIGHER TEMPERATURES

[Feed gas: 3:1 synthesis gas containing 80 grams sulfur per 100 s.c.f.]

| Exp. No. | Operating conditions | | | Composition, volume percent | | | | | Gross heating value, B.t.u./s.c.f. | |
|---|---|---|---|---|---|---|---|---|---|---|
| | Temp.,° C. | Pressure, p.s.i.g. | Space velocity, vol./vol./hr. | $H_2$ | CO | $CH_4$ | $CO_2$ | $C_2H_6$ | Total gases | CO-free |
| 1 | 475 | 1,000 | 200 | 32.0 | 0.0 | 57.9 | 8.7 | 1.4 | 715 | 785 |
| 2 | 550 | 1,000 | 200 | 22.0 | .2 | 69.1 | 8.5 | 0.2 | 775 | 850 |
| 3 | 600 | 1,000 | 200 | 30.6 | .6 | 57.8 | 10.7 | .3 | 690 | 775 |
| 4 | 475 | 500 | 110 | 35.3 | .3 | 52.7 | 11.1 | .6 | 660 | 745 |
| 5 | 550 | 500 | 100 | 32.9 | .2 | 56.8 | 9.9 | .2 | 685 | 760 |

What is claimed is:

1. A process for producing gaseous hydrocarbons consisting of passing a mixture of gases to a pressurized heating zone containing $WS_2$ catalyst whereby said gaseous hydrocrabons are produced therein, said mixture of gases containing substantially only hydrogen and carbon oxide selected from the group consisting of carbon monoxide, carbon dioxide or a mixture of said monoxide and dioxide; and removing said gaseous hydrocarbons from said heating zone.

2. The process of claim 1 in which the temperature in said heating zone is from about 475° C. to about 600° C. and the pressure is from about 50 p.s.i.g. to about 6000 p.s.i.g.

3. The process of claim 1 in which the mixture of gases comprises hydrogen and carbon monoxide in a ratio of about 3:1.

4. The process of claim 3 in which the temperature in said heating zone is from about 475° C. to about 600° C. and the pressure is from about 500 p.s.i.g. to about 4000 p.s.i.g.

5. A process for producing gaseous hydrocarbons consisting of passing a mixture of gases to a pressurized heating zone containing $WS_2$ catalyst whereby said gaseous hydrocarbons are produced therein, said mixture of gases containing substantially only (a) hydrogen, (b) a gas selected from the group consisting of (i) hydrocarbon gas, (ii) a gas substantially completely inert with respect to chemical reactions occurring in said pressurized heating zone, or (iii) a mixture of said hydrocarbon gas and said inert gas, and (c) carbon oxide gas selected from the group consisting of carbon monoxide, carbon dioxide or a mixture of said monoxide and dioxide; and remvoing said gaseous hydrocarbons from said heating zone.

6. The process of claim 5 wherein carbon monoxide is present in said mixture of gases, and the $H_2$:CO volume ratio is about 3:1.

7. The process of claim 6 wherein the temperature in said heating zone is about 475° C. to about 600° C. and the pressure is from about 500 p.s.i.g. to about 4000 p.s.i.g.

References Cited

UNITED STATES PATENTS 2,029,895    2/1936    Rittmeister _____ 196—53

FOREIGN PATENTS 1,085,287    7/1960    Germany.

MORRIS O. WOLK, *Primary Examiner.*

J. D. OLSEN, *Assistant Examiner.*

U.S. Cl. X.R.

252—467